July 23, 1957 W. E. STARY 2,800,548
PRESSURE SWITCH

Filed July 7, 1953 2 Sheets-Sheet 1

INVENTOR.
Walter E Stary

July 23, 1957

W. E. STARY 2,800,548

PRESSURE SWITCH

Filed July 7, 1953

INVENTOR.
Walter E. Stary

United States Patent Office 2,800,548
Patented July 23, 1957

2,800,548
PRESSURE SWITCH
Walter E. Stary, El Monte, Calif.
Application July 7, 1953, Serial No. 366,553
5 Claims. (Cl. 200—82)

This invention relates to pressure-sensitive devices in which the device operates to actuate an electrical switch when a preselected pressure condition is established. The pressure-switch is connected into a pressurized circuit so that it senses the circuit pressure, and when the preselected pressure condition is established the electrical switch is operated to thus perform its function in a control-circuit sequence.

There are many different designs of such pressure switches now in use. They use various means for getting a movement to indicate the desired pressure. These means include using Bourdon tubes, metal bellows, and pistons with various linkage arrangements. Many of these devices are not easily adjusted to actuate the switch at different pressures. Most of them are delicate and subject to drift under repeated use. Most of the devices in current use, which are adjustable, do not operate repeatedly at the same pressure, often the operating tolerance is five to ten percent of the pressure setting.

The principal object of this invention is to provide a pressure switch which will repeatedly operate at a substantially precise and uniform pressure.

Another object of this invention is to provide a pressure switch which can be adjusted to operate at various pressures within a reasonable range.

Further objects of this invention are to provide a pressure switch which is free from delicate parts so that it can withstand heavy and continued industrial use and abuse with little or no maintenance, and to provide a pressure switch which can be produced at an economical cost.

These and other objectives and advantages of this invention will become apparent from the following description when taken in connection with the accompanying drawings, in which.

In current manufacturing practices, there are pressure-powered mechanisms which use hydraulic or pneumatic power and which are automatically sequenced through at least a part of their work cycle in consequence of the establishing of a particular pressure condition. Often, the uniformity of the end result is proportional to the uniformity of the pressure at which a pressure-sensitive device actuates a step of the sequence.

Other applications include sensing pressure-conditions in fluid or gaseous systems where actuating an electrical switch at a preselected maximum or minimum pressure provides a desired control.

Figure 1:
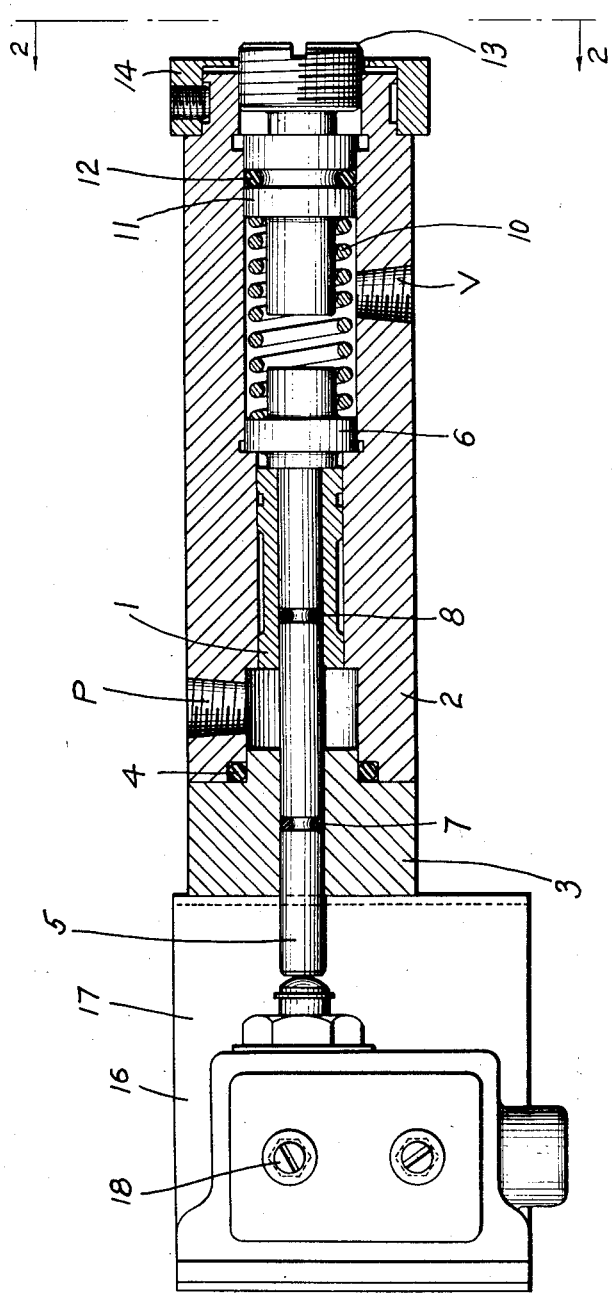
Fig. 1 is a longitudinal section through a pressure-sensitive device designed in accordance with this invention.

Fig. 1 shows a preferred form of this invention. The piston 1 is precisely and freely fitted into the bore of cylinder 2. The end-cap 3 attaches to the end of cylinder 2 by means of bolts not shown. Gasket 4 between the cylinder and its end-cap prevents pressure from escaping through this joint.

Piston rod 5 is floatably connected to piston 1 by providing the needed clearance in the hole bored through said piston so as to allow rod 5 to move laterally and thus align itself freely with the bored hole through end-cap 3. The head 6 on piston rod 4 restricts the axial movement, in one direction, of piston 1. And the head 6 of piston rod 5 limits, in one direction, the axial movement of rod 5.

Gasket 7, shown set in a groove in rod 5, prevents pressure from escaping out through the bore of end-cap 3. Gasket 8, also shown set into rod 5, prevents pressure from escaping through the bored hole in piston 1.

The compression spring 10 pushes against head 6 of piston rod 5 and thus restrains piston 1 from moving until pressure entering port P in cylinder 2 rises sufficiently so that pressure acting on the area of the annulus of piston 1 exposed to said pressure produces a force sufficient to compress spring 10, thus allowing piston 1 together with piston rod 5 to move axially.

Spool 11 cages and guides spring 10. Gasket 12 seals the joint between spool 11 and the bore of cylinder 2. Plug 13 engages the internal thread in the end of cylinder 2 to thus locate plug 13 axially. The boss on plug 13 bears against the head of spool 11 and thus restrains said spool from being pushed out by spring 10.

Figure 2:
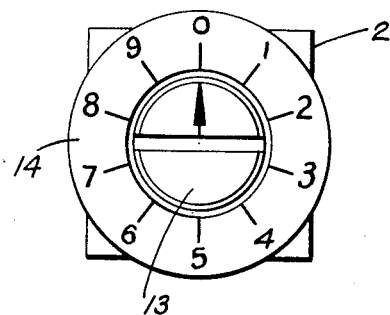
Fig. 2 shows an end view of the device of Fig. 1 showing a means of calibrating the pressure-setting adjusting mechanism.

Fig. 2 illustrates how the dial of ring 14 may be numbered in a suitable calibrating system. Then a pointer engraved in the surface of the head of plug 13 provides means for setting the device to act at various pressures. Ring 14 may be rotated on cylinder 2 and locked in position by means of a set screw to thus get the zero or base point at any desired position.

If the range of adjustments is large enough to require turning plug 13 more than one turn, the base point may be set with the surface of the head of plug 13 flush with the surface of ring 14. Controlling the length of the boss on the inner surface of plug 13 provides a means for getting the surfaces of plug 13 and ring 14 flush at the desired base point. Then adjustments are made by counting full turns of plug 13 together with a part of a turn as indicated by the calibrations, much the same as setting a conventional micrometer.

Switch 16, shown in Fig. 1, is a conventional switch such as a "Micro" switch in which the axial movement of the plunger produces a snap action of the switch mechanism. Switch 16 is connected to bracket 17 by means of screws 18. Bracket 17 is attached to end-cap 3 of cylinder 2 by screws not shown. The normal position of the device, as shown in Fig. 1, has the plunger of switch 16 depressed by the end of piston rod 5. When the pressure rises and moves piston 1, piston rod 5 is lifted off the switch plunger, thus operating the switch.

Figure 3:
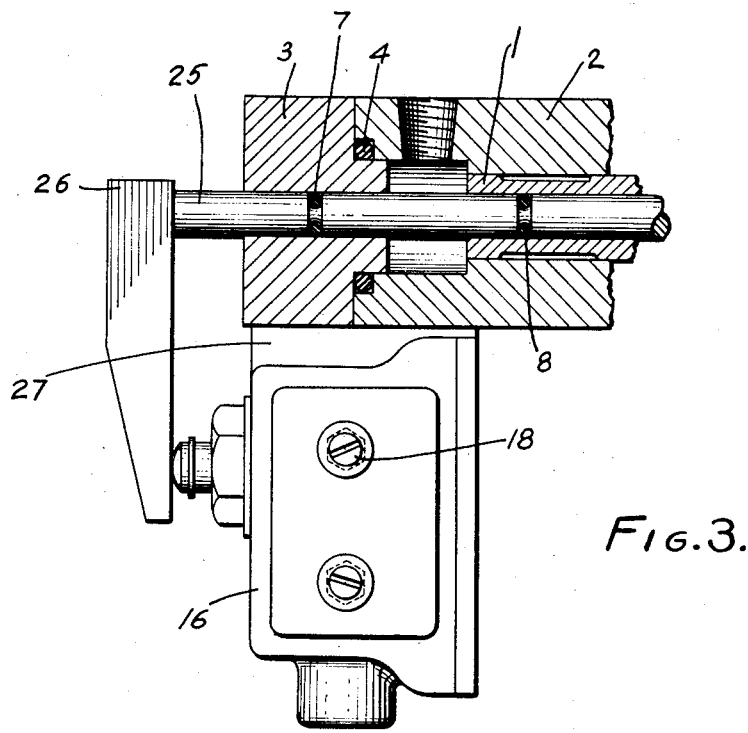
Fig. 3 shows an alternate method of mounting the electrical switch.

Fig. 3 shows an alternate arrangement of the electrical switch in which the switch plunger is depressed as piston rod 25 is lifted by the rising pressure. In Fig. 3, piston rod 25 is floatably connected to piston 1. Bracket 26 rigidly connects to piston rod 25. Switch 16 is attached to bracket 27 by screws 18. Bracket 27 connects to cylinder 2 by screws not shown.

Commercially obtainable switches, such as the one illustrated, provide for a reasonable, but limited, amount of over-travel of the switch plunger. In Fig. 1, the depressing of the switch plunger is limited by the head 6 of piston rod 5 which seats in cylinder 2. In its normal position with no pressure in cylinder 2, piston rod 5 pushes against the plunger of switch 16 to depress said plunger beyond the switch-tripping point, but less than the allowed maximum over-travel. Piston rod 5 moving, as the pressure increases, does not put any loading on the switch plunger since the piston rod is merely lifted off the switch.

In Fig. 1, the movement of piston 1 and the lifting of piston rod 5 is limited by the boss on spool 11. The length of said boss is set to allow sufficient movement of piston rod 5 to release the switch plunger at the highest operating pressure for the device. Then as plug 13 is backed off, thus allowing spool 11 to back off, piston 1 and piston rod 5 make a longer stroke if a sufficiently high pressure is developed. By proper design, this additional travel is held to such a limit that spring 10 is not overstressed, and the limiting stress in spring 10 is that obtained when the head 6 of piston rod 5 bears against the boss on spool 11.

With the arrangement in Fig. 3, the boss on spool 11 also serves to prevent bracket 26 from moving beyond the allowed over-travel limit for the plunger in switch 16.

A main objective of this invention is to provide a mechanism free from friction so that for a particular pressure the movement of piston 1, and piston rod 5, is always a uniform amount, thus tripping the electrical switch at a uniform pressure.

Switches, such as switch 16, are commercially obtainable in which the snap action of the switching mechanism repeatedly operates at an exact travel position of the plunger, with the position of the plunger when the snap-action of the switch occurs repeating exactly within a tolerance of 0.0005 inch. Thus by having the traveling members of the device move with a minimum amount of drag so that variations in this drag are also a minimum, the switch is repeatedly actuated at precisely the same pressure.

Piston 1 is a free but close fit in the bore of cylinder 2. By making the length of piston 1 several times its diameter the leakage past said piston is reduced to a minimum. For example, units of this design have been made with the piston fitting freely so there is no perceptible drag, yet at 1000 p. s. i. pressure the leakage past the piston is less than 10 drops per minute of light hydraulic oil.

In Fig. 1, the leakage past piston 1 enters the spring compartment in cylinder 2. The pressure medium thus escaping past said piston may be returned to a suitable receptacle, not shown, by connecting said receptacle to port V. This return connection, in its preferred form, is such that the pressure in the spring compartment of cylinder 2 remains at atmospheric pressure, or a constant pressure, at all times so that the resistance to axial movement of piston 1 is only that provided by spring 10, or a constant increment adding to spring 10.

By making the diameter of piston rod 5 small, the area of the gripping surface of the packing in end-cap 3 is reduced to a minimum, thus getting a minimum amount of drag from this seal.

By positioning switch 16 so there is some movement of piston rod 5 before the plunger of switch 16 moves to the tripping position, the effects of the static friction of the piston-rod seal, which may be variable, are eliminated for the conditions where the pressure is constantly changing for an increment of time prior to the time when the pressure reaches the switch-tripping pressure.

An alternate design which eliminates the piston-rod-seal drag has an end-cap with a vented cavity between the two ends of the hole through said end-cap. Then by making the hole through the end-cap a close free fit, similar to the fit of spool 1 in cylinder 2, the leakage past the inner portion of the hole through the end-cap can be drained away from the central cavity so that it does not escape past the outer portion of the hole through said end-cap. Thus all drag effects from a seal around piston rod 5 are eliminated.

Another alternate design has the piston rod reversed so that it projects out through the adjusting-mechanism end of the cylinder. Thus the piston rod would pass through a hole bored through spool 11 and through a hole bored through plug 13. The electrical switch would then mount on the adjustment end of the cylinder.

The drawings show O ring seals on piston rod 5, but the type of seal is not a basis for the invention. Chevron, U, or other conventional types of seals, which can be adapted to the requirements, are equally suitable.

The drawings show a compression spring supplying the force resisting the piston being moved by the pressure. However, it is evident other means could be used for supplying this force without departing from the spirit of the invention. These other means for supplying the resisting force include using a rubber compression member or a tension spring instead of the compression spring. The tension spring would be connected to the other end of the piston, or to the piston rod, either inside the cylinder or externally.

Other means for providing a calibrated adjusting mechanism include using a micrometer type mechanism with the thimble replacing ring 14 and with the thimble attached to cylinder 2, and with the screw of the micrometer type unit replacing the plug 13 so that it bears against the end of spool 11.

All the movements of the mechanism are described in connection with a rising pressure being applied to actuate the electrical switch when the pressure rises high enough to operate the mechanism. It is recognized that the device serves equally well when subjected to a high pressure and then senses a lower pressure that occurs when the said high pressure drops to the lower value.

While the invention has been described with reference to the particular devices illustrated, it is to be appreciated that it is not so limited. It is rather of a scope commensurate with the scope of the subjoined claims.

What I claim as my invention is:

1. A pressure switch having a piston axially movable in a cylinder, means for introducing pressure into one end of the cylinder to produce a force acting on one end of the piston, a piston rod connected to said piston and extending through a bore in the end of the cylinder housing, a spring caged in said cylinder housing so as to produce a preselected force acting on said piston and opposing said pressure-produced force, and an electrical switch located in a fixed position relative to said cylinder housing so as to be operable by said piston rod when said piston rod is moved a preselected distance by a change in the pressure-produced force resulting from a change in the pressure acting on said piston, in which said piston is a tubular member freely slidable in said cylinder, and in which said piston rod passes through and is floatably connected with said tubular piston so that said piston rod is transversely floatable, in said tubular piston, to properly align itself with said bore in the end of said cylinder housing to thereby be freely movable through said bore in the end of said cylinder housing.

2. A pressure switch as in claim 1; wherein said piston rod is a relatively small-diameter rod so that said piston rod may be a freely movable fit in said bore in the end of said cylinder housing with an annular clearance of minimum area to thereby give an assembly most resistant to leakage of the pressure-producing medium.

3. A pressure switch as in claim 1; wherein a packing ring seals off the annular space existing between piston-rod surface and the bore of said tubular piston thereby preventing leakage of the pressure-producing medium through said annular space between said piston-rod surface and said bore of said tubular piston.

4. A pressure switch as in claim 1; wherein a packing ring seals off the annular passage existing between piston-rod surface and said bore in the end of said cylinder housing thereby preventing leakage of the pressure-producing medium through said annular passage existing between said piston-rod surface and said bore in the end of said cylinder housing.

5. A pressure switch as in claim 1; wherein said piston rod is a relatively small-diameter rod, with a packing ring sealing off the annular space existing between piston-rod surface and the bore of said tubular piston, and with a packing ring sealing off the annular passage between piston-rod surface and said bore in the end of said cylinder housing, whereby said small-diameter piston rod permits the use of a small area packing between said piston-rod surface and the bore in the end of said cylinder housing to thus reduce to a minimum the frictional resistance encountered when said piston rod is axially moved to actuate said electrical switch.

References Cited in the file of this patent

UNITED STATES PATENTS

| | | |
|---|---|---|
| 2,435,143 | Knauth | Jan. 27, 1948 |
| 2,492,261 | Bordelon | Dec. 27, 1949 |
| 2,507,065 | Trautman | May 9, 1950 |
| 2,529,688 | Grupp | Nov. 14, 1950 |

FOREIGN PATENTS

| | | |
|---|---|---|
| 644,140 | France | May 26, 1928 |